(12) United States Patent
Skidmore et al.

(10) Patent No.: US 6,442,507 B1
(45) Date of Patent: Aug. 27, 2002

(54) SYSTEM FOR CREATING A COMPUTER MODEL AND MEASUREMENT DATABASE OF A WIRELESS COMMUNICATION NETWORK

(75) Inventors: Roger R. Skidmore; Theodore S. Rappaport, both of Blacksburg, VA (US)

(73) Assignee: Wireless Communications, Inc., Blacksburg, VA (US)

( * ) Notice: Subject to any disclaimer, the term of this patent is extended or adjusted under 35 U.S.C. 154(b) by 0 days.

(21) Appl. No.: 09/221,985

(22) Filed: Dec. 29, 1998

(51) Int. Cl.[7] .................. G06F 11/30; G06F 15/00; G21C 17/00
(52) U.S. Cl. .............................. 702/186; 342/463
(58) Field of Search .................... 702/186; 342/60, 342/357.01, 357.08, 357.07, 357.09, 357.13; 455/73, 446, 463

(56) References Cited

U.S. PATENT DOCUMENTS

| | | | |
|---|---|---|---|
| 5,337,149 A | * | 8/1994 | Kozah et al. ................ 356/601 |
| 5,458,123 A | * | 10/1995 | Unger ......................... 600/509 |
| 5,528,518 A | * | 6/1996 | Bradshaw et al. ........... 702/150 |
| 5,539,665 A | * | 7/1996 | Lamming et al. ............ 709/224 |
| 6,006,021 A | * | 12/1999 | Tognazzini ..................... 703/1 |
| 6,204,813 B1 | * | 3/2001 | Wadell et al. ............... 342/463 |

OTHER PUBLICATIONS

Gray Somerville and Todd Baylor, Apr. 1996, Intertec, vol. 13, pp. 98+.*

Shawn Steward, Sep. 1996, Intertec, vol. 13, pp. 22+.*

* cited by examiner

*Primary Examiner*—John S. Hilten
*Assistant Examiner*—Demetrius Pretlow
(74) *Attorney, Agent, or Firm*—Whitham, Curtis & Christofferson, PC

(57) ABSTRACT

A system for creating a computer database model of either measured data network throughput properties or wireless communication signal properties within a facility by measuring the desired properties at a plurality of locations within the facility and embedding the measured properties at the location of measurement represented in a three-dimensional facility drawing database.

12 Claims, 6 Drawing Sheets

SYSTEM FOR CREATING A COMPUTER MODEL AND MEASUREMENT DATABASE OF A WIRELESS COMMUNICATION NETWORK

BACKGROUND OF THE INVENTION

1. Field of the Invention

The invention generally relates to an indoor mobile wireless communication data measurement system and more particularly to an indoor signal property measuring device that utilizes a mobile personal computer connected to a receiver for measuring location specific wireless communication system signal properties and data network throughput properties within a facility and embedding the measured properties at the measurement location within a three-dimensional drawing of the facility stored in the computer.

2. Description of the Related Art

In recent years the use of wireless communication technology, such as cellular phone networks, has greatly increased. Moreover, it has become common to implement wireless communication systems within buildings or large facilities comprising several buildings. Examples of typical wireless communication systems are local area networks (LAN), wide area networks (WAN), or cellular phone networks such as PBX, or local loops. Due to the increasingly diverse applications of wireless communication systems, system designs have become increasingly complicated and difficult to implement.

Common to all wireless communication system designs, regardless of technology, size or scale, is the need for measurement data at some point in the design process. Whether in the initial design stage or the final verification stage, no wireless communication system is implemented without the input of measurement data. However, measurement acquisition in in-building environments is much more tedious and time consuming than in the macrocellular environment where measurement acquisition is carried out using Global Positioning System data to determine the location of the measurement being taken. Global Positioning System (GPS) data, which so many RF engineers have come to rely upon for outdoor measurement acquisition, is not an option for microcell environments. Therefore, recording real-time measurement data within a building becomes a laborious, time-consuming task involving scratched notes and blueprints and manual data entry which are both expensive and ineffectual in many respects.

In addition to measuring RF signal properties from emitted base transceivers there is also a need to measure data throughput time in computer data networks. Throughput time is the time required to transfer a record or file of known size from one computer to another. In order to standardize the measurement of data throughput time for comparison or verification purposes, files of a set size (e.g. 100K) are used and transferred in packet sizes such as 512 bytes. Similar to RF signal attenuation, data throughput time is also a function of transmission distance and signal obstruction (e.g. walls, doors, partitions), as well as multipath propagation and the specific radio modem design.

Various signal property measurement acquisition tools and systems have been developed to aid in the design of wireless communication systems such as PenCat™, Walkabout PCS™ and TEMS Light.

LCC International Inc. offers the PenCat™ as a pen-based collection and analysis tool for wireless communication design that runs on a small hand-held tablet computer. The PenCat™ system enables a user to roam about a building, take signal property measurement data at a location in the building using a receiver linked to the tablet computer, and link the measured data to that building location on a computer map representing the building by tapping the appropriate portion of the map on the computer screen with a stylus pen. The building map can be entered into the PenCat™ system by either scanning blueprints, sketching the building within the application, or importing from another source.

Safco Technologies, Inc. offers the Walkabout PCS™ system as a portable survey coverage system for use in indoor or outdoor wireless communication system design. Similar to PenCat™, the Walkabout PCS™ system utilizes a hand-held computer linked to a receiver for measuring signal properties at a given location and linking the measured property data to that location represented on a stored computer map.

Ericsson Radio Quality Information Systems offers the TEMS Light system as a verification tool for wireless communication indoor coverage. The TEMS Light system utilizes a Windows-based graphical interface on a mobile computer linked to a receiver to allow a user to view a stored building map, make location specific data measurements, and link the measured data to the represented location on the stored computer map.

In addition to the above-discussed wireless communication systems verification tools, various wireless communication system prediction tools have also been devised such as Wireless Valley Communications Incorporated's Predictor™ and Ericsson Radio Quality Information Systems' TEMS. Predictor™ allows a wireless communication system designer to predict the coverage area of a particular wireless system in a building or across multiple buildings. Predictor™ creates a computer simulation using a computer stored building or facility database and a defined transceiver location and type within the database. Based on the building configuration and building material properties defined in the database a prediction of the coverage area of the wireless system is extrapolated by site-specific propagation whereby rays drawn between the transmitter and receiver and three-dimensional building information are used for prediction computations. The TEMS system predicts indoor coverage of a wireless system based on a stored building map and input base transceiver locations and types using statistical radio coverage models.

While the above-mentioned design and verification tools have aided wireless system designers in creating indoor wireless communication systems using building drawings and linking data measurements to building drawings, none of the devices, except Predictor™, incorporate three-dimensional building drawings to enhance the design process. Further, the above-mentioned devices and systems lack the ability to track a roving user within the building while the user is taking measurement data. Even further, none of the above-mentioned devices contemplates measuring data throughput properties for a computer data network at various locations within a facility. These capabilities may be required for installation and management of wireless devices for global network access.

SUMMARY OF THE INVENTION

It is therefore an object of the present invention to facilitate measurement data acquisition for designing wireless communication systems within a facility.

It is another object of the present invention to scan, sketch, or import drawings of a facility into a computer to create a three-dimensional drawing database.

It is another object of the present invention to embed measured location-specific signal properties in a site-specific three-dimensional drawing database.

It is yet another object of the present invention to embed measured location-specific LAN data throughput properties in a site-specific three-dimensional drawing database.

It is still another object of the present invention to track a user within a building using a distance measuring mechanism and a stored site-specific three-dimensional drawing database.

It is yet another object of the present invention to average incoming measurement data over an interval of time or a unit distance.

The invention uses a three-dimensional drawing database of a facility and can position measured site-specific signal property information within a microcell environment using small, portable transceivers or receivers which continually report their measurement findings in real-time through a communication link with a computer (e.g., serial port, parallel port, or buffering circuit). The computer may be a personal computer, laptop, or other mobile computer. The process of taking in-building measurement data is then reduced to simply setting up a test transmitter at the selected facility site, configuring the transmitter within the three-dimensional drawing database, connecting the portable transceiver or receiver to the computer, and roaming throughout the three-dimensional drawing environment, identifying where the receiver is in the building at any given time by pointing and clicking within the drawing or employing a location tracking mechanism. A wheeled tracking mechanism is carried with a user and linked to the computer for measuring roaming distance between time intervals based on the number of wheel rotations. At each time interval the receiver location is identified, using the distance traveled by the tracking mechanism. Simultaneously, measurement data from the connected receiver is recorded, logged, and embedded directly in the three-dimensional drawing at the identified location. While the wheeled tracking mechanism is described in the preferred embodiment, other types of tracking or distance measuring devices can be used (e.g. laser range finder, sonar range finder).

An alternative to using a tracking device is to select a starting location in the stored three-dimensional facility drawing database and begin walking and measuring signal properties. Then select a stopping location once the walking and measuring process is stopped. Based on the starting and stopping locations the computer calculates a straight line path between the locations and distributes the measured data in one of several user specified formats. The user may specify that the measured data be distributed along the path at intervals of time, distributed along the path at units of length, or averaged and distributed along the path at units of length or time.

Using similar measurement acquisition methods described above the data throughput properties of a wireless computer data network can also be measured. This is accomplished by creating a link between a server computer and a mobile client computer, transferring a record of standardized size between the server and mobile client computer, and measuring the time required to transfer the record. This process can be carried out at a plurality of locations within a facility. At each location the measured time is recorded and embedded at the measurement location within a three-dimensional facility drawing database. Additionally, the server computer can also be mobile.

In addition to creating a three-dimensional database model and performing measurements in in-facility wireless communications and data networks the invention is capable of verifying the signal properties and data throughput properties of existing wireless communication and data networks.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
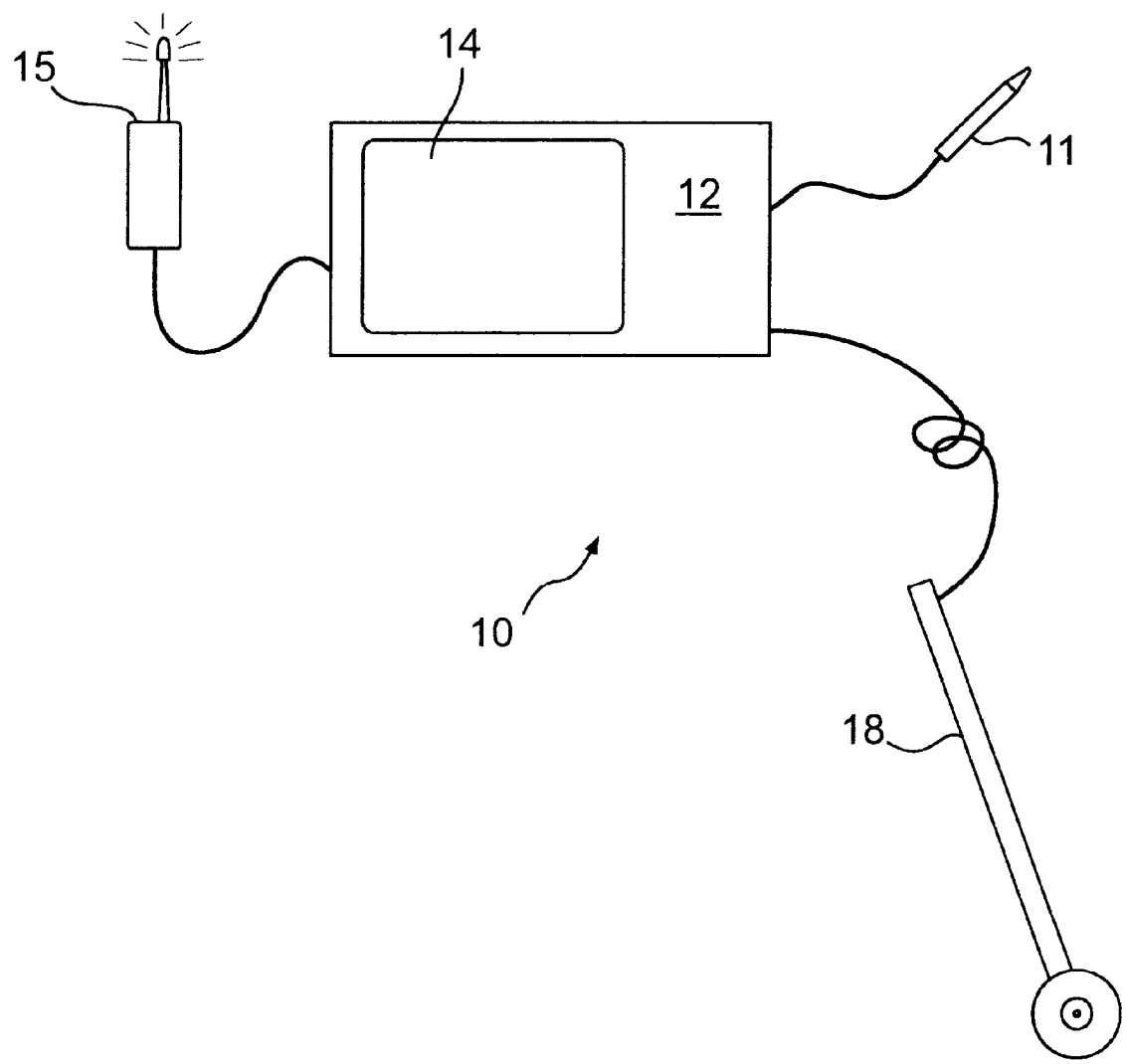
FIG. 1 is a schematic representation of the preferred embodiment of the measuring apparatus.

Referring now to FIG. 1 there is shown a mobile system 10 for measuring location-specific signal properties within a facility such as a building or a campus of buildings (not shown). A transceiver or receiver 15 for receiving signals from a base transceiver is connected to a mobile computer 12 through the computer's serial port (not shown). The computer 12 runs a software program (not shown) and has a display 14 for displaying a three-dimensional facility drawing stored on the mobile computer's disk drive and a wheeled distance measuring device 18 for measuring the distance traversed by the user of the mobile computer 12 as he/she roams about the facility. When measurement data is to be recorded, the user may manually point and click on the building drawing portion on the display 14 representing his/her actual location in the facility and take a measurement. Once recorded, the measurement data will be logged and embedded in the stored three-dimensional building drawing database at that location. Alternately, the user may employ the distance measuring device 18 connected to the mobile computer 12. Using the distance measuring device 18 a user may select a starting point in the building drawing displayed on the computer display 14 using manual coordinate input or a point and click device 11. Once the starting point is defined the user begins walking in a predefined direction such that at periodic time intervals the distance from the input starting point is recorded and signal measurement is taken. Both the distance measurement and signal measurement are embedded in the building drawing database as a measurement and corresponding building drawing location. Alternately, in addition to or in lieu of the wheeled distance measuring device 18 shown in FIG. 1, other distance measuring devices may be used.

The three-dimensional building drawing database stored in the mobile computer 12 may be imported from another computer, scanned in from an existing paper drawing, or drawn using the computer 12. Regardless of how the drawings are entered into mobile computer 12, the drawings may be manipulated and modified within the computer depending on the needs of the user.

The system described in FIG. 1 is capable of interfacing with a variety of transceivers or receivers such as, but not limited to, the ZK-Celltest SAM with cellular phone and real-time serial port interface, the Tektronix 2782 Spectrum Analyzer with a real-time IEEE 488.2M interface, a Proxim RangeLAN™ wireless modem, and a receiver without real-time interface.

Figure 2A:
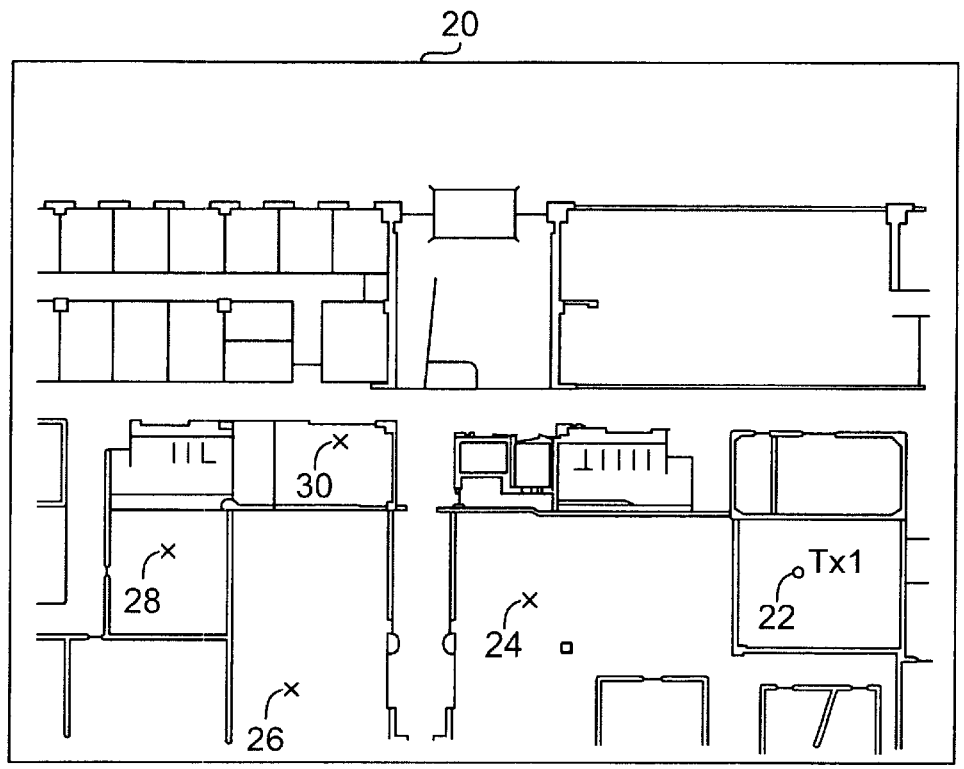
FIG. 2A is a representation of a computer screen according the preferred embodiment of the present invention showing a top view of a building floor plan with various measurement location points.

FIG. 2A shows a portion of a building floor represented on a computer screen 20 using a stored three-dimensional building drawing database. The building floor plan is shown as a typical top plan view wherein walls and partitions are noted by double lines and doorways are denoted by dotted lines. Before measurement gathering, the location of a base transceiver 22 is first entered into the three-dimensional building drawing database wherein the location is the two-dimensional position (x and y axis) of the transceiver within the plane of the floor and the height (z) of the transceiver above the floor. Then the user roams throughout the building with a mobile measuring apparatus as shown in FIG. 1, selects a location point 24, and measures the desired signal properties received from the transceiver 22. The measured signal properties are then logged and embedded into the three-dimensional building drawing database at the selected location point. After selecting a location 24 and making a measurement, the user may select more locations 26, 28, 30 and take more measurements at these respective locations for embedding in the building drawing database. Similar to the transceiver location, the height above the floor of measurement locations 24, 26, 28, 30 can also be specified. Hereinafter, location will be considered a three-dimensional position.

Figure 2B:
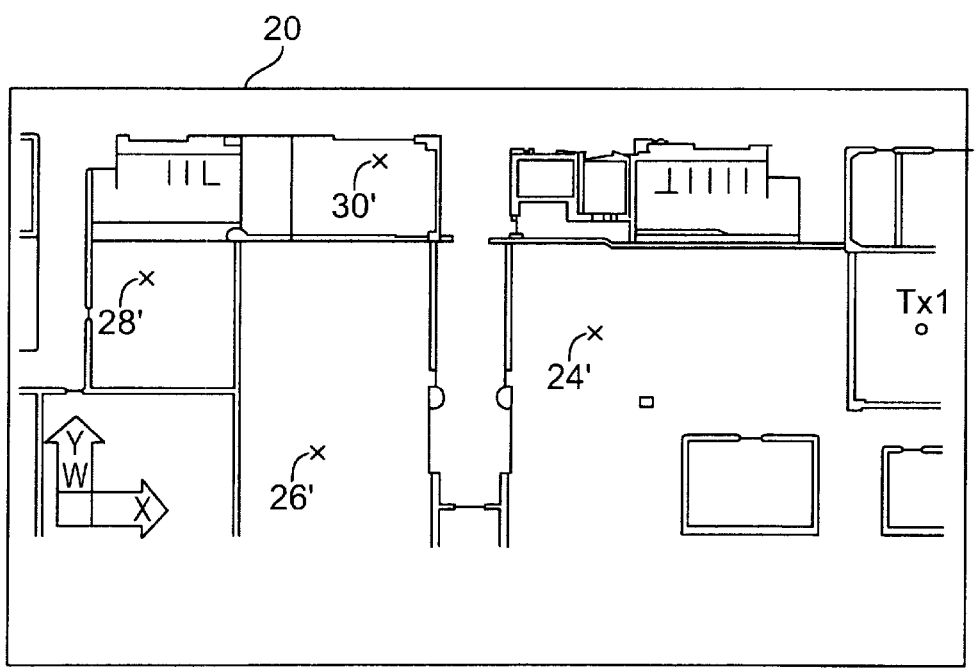
FIG. 2B is a representation of a computer screen according the preferred embodiment of the present invention showing a top view of a building floor plan with measured data values at their respective measurement points.

After the location-specific measurements 24, 26, 28, 30 have been taken, logged and embedded into the building drawing database, the results for each location can be displayed on the computer screen 20 as shown in FIG. 2B by 24', 26', 28', 30'. For example, as shown at point 24, a measured signal of −78.0 dBm was recorded, at point 26 a measured signal of −88.1 dBm was recorded, and so on.

Figure 3:
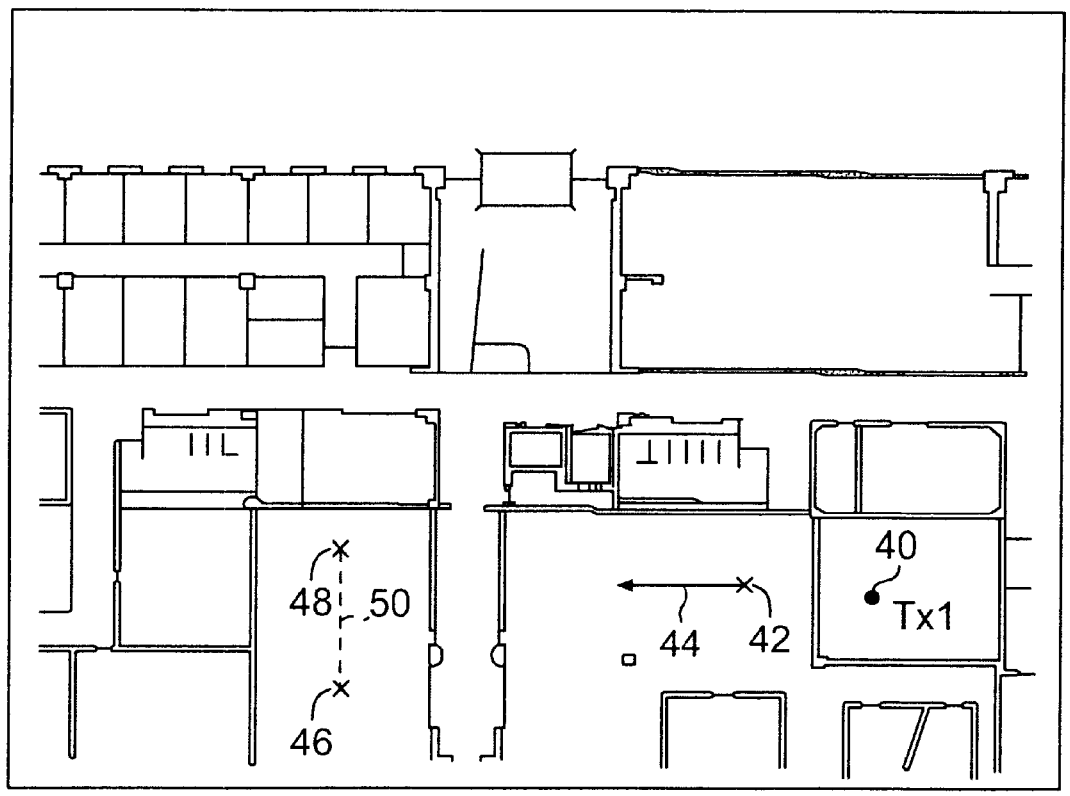
FIG. 3 is a representation of a computer screen according the preferred embodiment of the present invention showing a top view of a building floor plan with measurement acquisition locations.

FIG. 3 shows an alternate method for measurement acquisition using a user location tracking device. First, the base transmitter type and location 40 are defined in the building drawing database. Then a starting location 42 and a direction of travel 44 are defined in the building drawing database. Once the starting location 42 and direction of travel 44 are defined, the user simply starts the measurement process and walks in the defined direction. While walking, signal property measurements and the distance traveled from the starting point 42 are taken at periodic time intervals. Then using the defined starting point 42, direction of travel 44, and distance traveled a location within the building is calculated by the mobile user computer and the recorded measurement and location are embedded in the building drawing database. Several signal property measurements and corresponding distance measurements can be taken between the starting point 42 and the end of the operation. Additionally, instead of defining a direction of travel, start and stop points 46 and 48, respectively, may be defined within the drawing database such that the user walks between the two points 46 and 48, and a tracking device 18 measures the distance traveled while signal property measurements are taken at periodic time intervals and embedded in the building drawing database at the calculated location between points 46 and 48.

Another method of acquiring measurement data is for the user to specify a starting location 46, by clicking on the displayed building database, and walk a straight path while the attached measurement receiver is measures signal properties of signals emitted from base transceiver 40. The user then identifies the location 48 where he/she stopped walking, by clicking on the displayed building database. The computer then calculates a linear path 50 between the start 46 and stop 48 points. After the linear path 50 is calculated, the user has several options for distributing the measured data along the linear path 50 for subsequent embedding in the building drawing database. The user can specify that data should be recorded and embedded at specified time intervals. In this case, the recorded data is spaced evenly along the linear path 50 with each sequential measurement separated by the specified time interval. The other option is to distribute by distance. In this case, the recorded data is spaced evenly along the linear path 50 with each sequential measurement separated by a specified unit length. If more measurement data is available than recording slots along the path, the data can be averaged.

Using the measurement acquisition methods described in conjunction with FIGS. 2A and 3, signal properties can be measured at each floor of a multi-story building separately or all floors can be measured in a single run so long as the appropriate floor location is entered at the time of a measurement recording. Once measurements are recorded for the desired floors a three-dimensional model can be formed by either joining the separate floor measurements or using the single run having multiple floors.

Figure 4A:
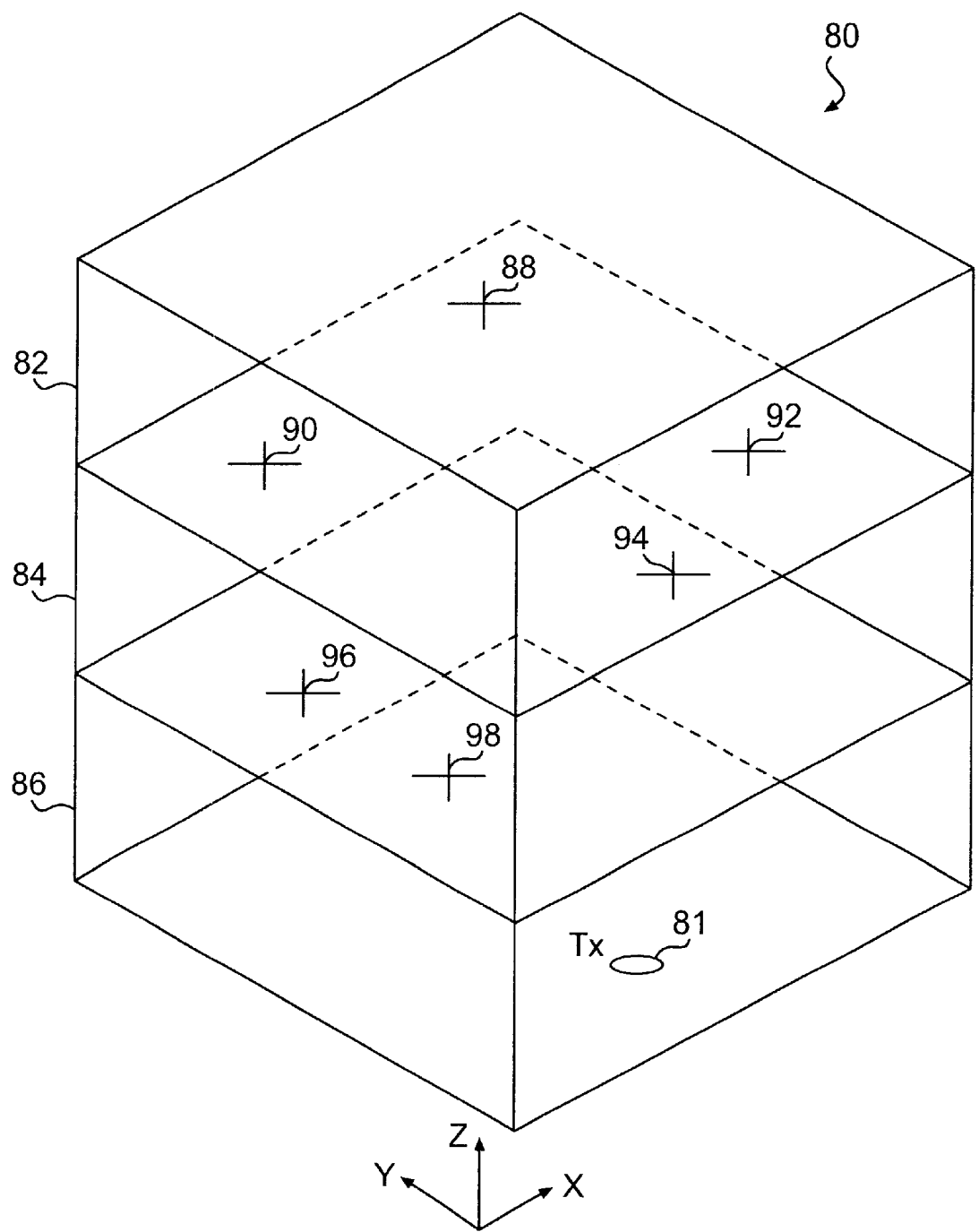
FIG. 4A is a perspective view of a three-dimensional building drawing as viewed from a computer display.

FIG. 4A shows a three-dimensional representation of a building 80 as might be seen on a mobile computer screen (FIG. 1). The building 80 has three floors 82, 84, 86. Measurement of the signal properties from transceiver 81 on floor 86 may be accomplished either on a floor by floor basis or as a single run. For example, signal property measurement locations 88, 90, 92 are measured on floor 82 and stored. Then, signal property measurement locations 94, 96 are measured on floor 84 and stored. Then, signal property measurement location 98 is measured on floor 86 and stored. Finally, all of the stored floors 82, 84, 86 along with the measured data embedded in each floor, may be aligned and joined together as a single database from which a model of the measured signal properties may be constructed. Alternately, measurement locations 88, 90, 92, 94, 96, 98 may be taken in random order and input into a single multi-floor database so long as the correct location of measurement us given. The correct location means the floor with the height above the floor (Z axis) on which the measurement is being taken and the location coordinates within the plane of the floor (X and Y axis) where the measurements are taken.

Figure 4B:
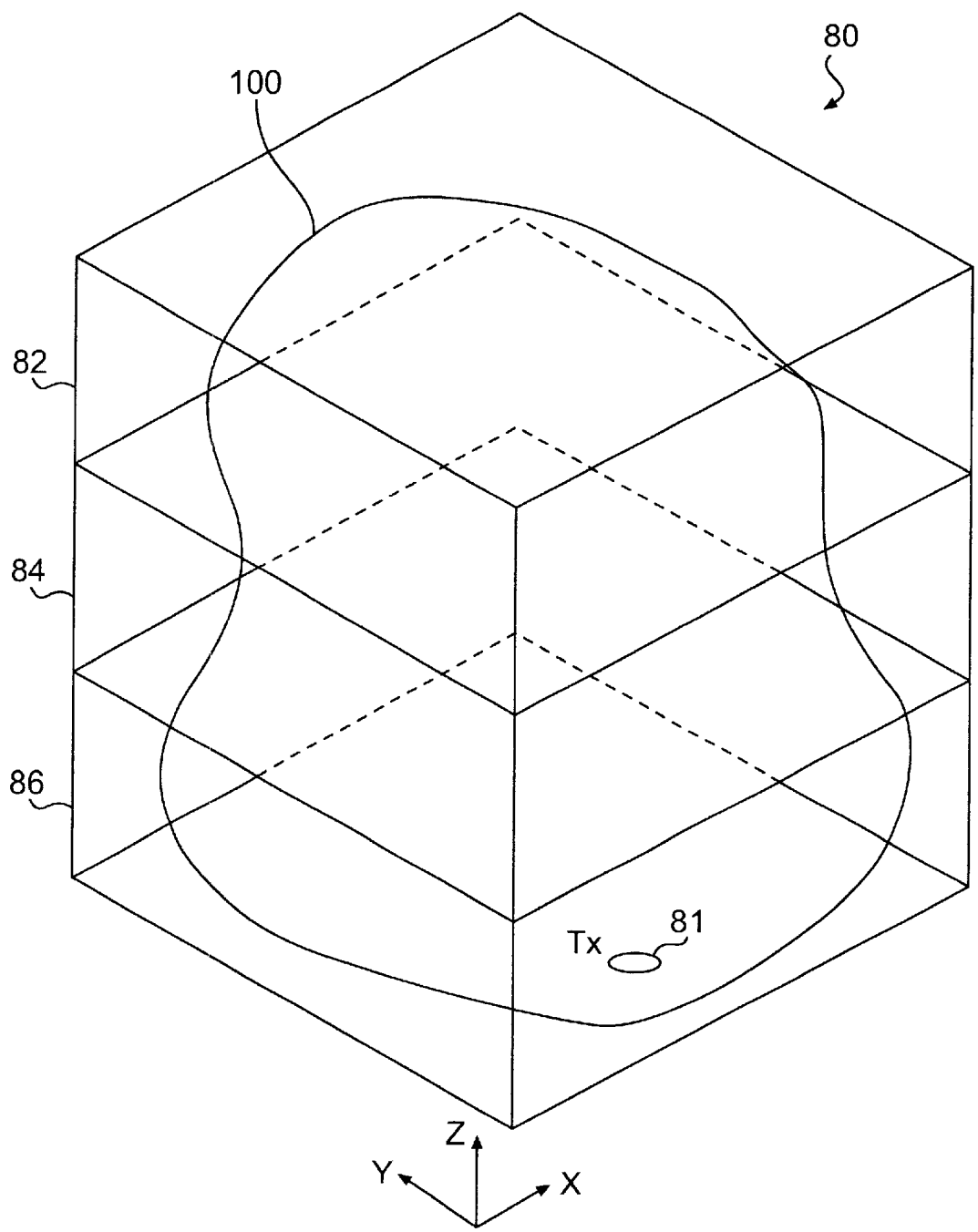
FIG. 4B is a perspective view of a three-dimensional building drawing and computer model of measured signal properties as viewed from a computer display.

FIG. 4B is a three-dimensional computer model of measured signal properties taken in FIG. 4A wherein the model may represent the best coverage area in building 80 based on the location of transceiver 81. However, it should be understood that the model 100 is simplified for exemplary purposes. Actual models will vary greatly in shape, size and complexity due to building configurations, transceiver placement, building materials, and the data being represented. Additionally, models can be created for any measured signal property.

Figure 5A:
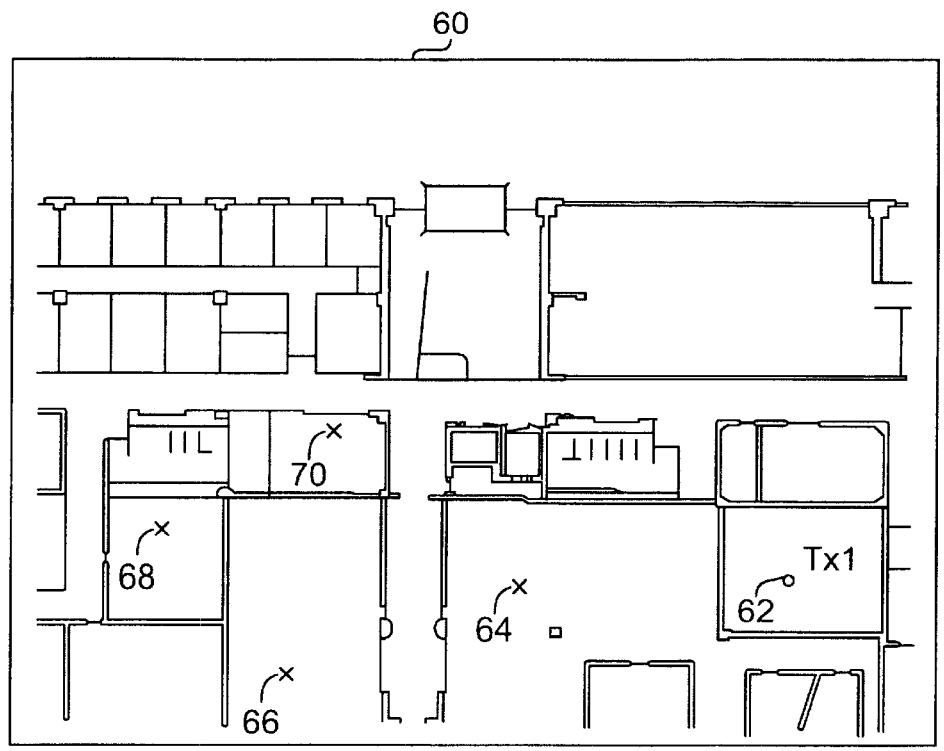
FIG. 5A is a representation of a computer screen according to the preferred embodiment of the present invention showing a top view of a building floor plan with various measurement location points.

FIG. 5A shows a portion of a building floor represented on a computer screen 60 using a stored facility drawing database. The building floor plan is shown as a typical top plan view wherein walls and partitions are noted by double lines and doorways are denoted by dotted lines. Before measurement gathering, the location of a base server computer 62 is first entered into the facility drawing database. Then the user roams throughout the facility with a mobile measuring apparatus as shown in FIG. 1, selects a location point 64, initiates a File Transfer Protocol (FTP), and connects to the base server computer 62 as a client. Once connected to the base server computer 62 the mobile measuring apparatus acting as a client computer transfers a selectable standard size file (e.g. between 1 Kb and 10 Mb) and a selectable packet size (e.g. 32 bytes to 4 Kb) to the base server computer and records the data throughput time for location 64. The measured and recorded data throughput time is then embedded into the building drawing database at the selected location point 64. After selecting a location 64 and making a measurement, the user may select more locations 66, 68, 70 and take more measurements at these respective locations for embedding in the building drawing database.

Figure 5B:
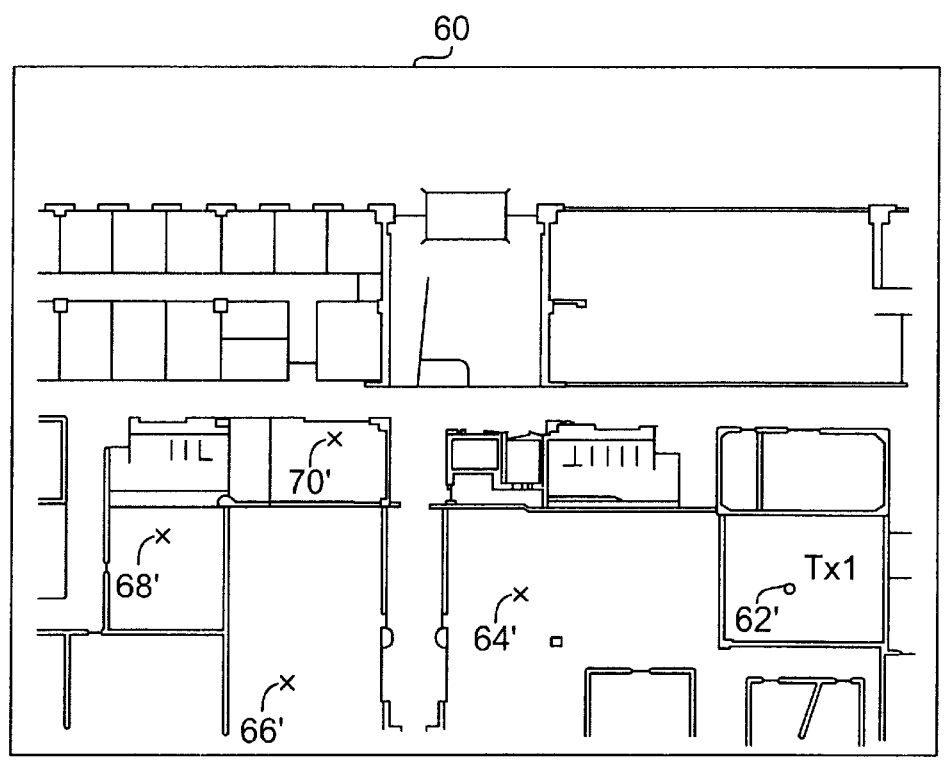
FIG. 5B is a representation of a computer screen according the preferred embodiment of the present invention showing a top view of a building floor plan with measured data throughput values at their respective measurement points.

After the location-specific measurements 64, 66, 68, 70 have been taken, logged and embedded into the building drawing database, the results for each location can be displayed on the computer screen 60 as shown in FIG. 5B by 64', 66', 68', 70'. For example, as shown at point 64', a measured throughput time of 54.2 kbps was recorded, at point 66' a measured throughput time of 53.0 kbps was recorded, and so on.

The data throughput property gathering scheme outlined in conjunction with FIG. 5A can be carried out for each floor in a multi-floor facility or, as shown in FIG. 4A, as a single run so long as the correct floor is selected from the facility drawing database at the time of measurement. Once data throughput measurements are recorded for the desired floors a three-dimensional model can be formed by either joining the separate floor measurements or using the single run containing multiple floors. Similar to FIG. 4B, a three-dimensional computer model created from the measured data may be configured to model the measured throughput properties in various useful ways such as the best throughput time locations or the degradation or improvement of throughput time based on location.

Note that in addition to data throughput rate over the wireless channel, the present invention incorporates the ability to measure frame errors, packet retries, network data throughput, and network delay due to the fixed non-wireless portion of any network, such capabilities being dependent upon the specific connected radio transceivers or receivers and the particular transfer protocol.

While the invention has been described in terms of its preferred embodiments, those of skill in the art will recognize that the invention can be practiced with modification within the spirit and scope of the appended claims.

We claim:

1. A system for creating a computer database model of measured RF signal properties within a facility, comprising:
    at least one base transceiver, positioned in a facility, for transmitting or receiving RF signals;
    at least one mobile transceiver for measuring the properties of said RF signals at a plurality of locations within said facility;
    means for representing said facility in a computer database model;
    means for automatically periodically determining a location of said mobile transceiver within said facility;
    means for embedding said measured RF signal properties at said location within said computer database model of said facility, said means for automatically periodically determining and said means for embedding being operable at each of said plurality of locations; and
    means for displaying said computer database model of said facility overlayed with said embedded signals.

2. A system for creating a computer database model of measured RF signal properties within a facility as claimed in claim 1 wherein said facility is a single multi-level building.

3. A system for creating a computer database model of measured RF signal properties within a facility as claimed in claim 1 wherein said facility is a plurality of multi-level buildings.

4. A system for creating a computer database model of measured RF signal properties within a facility as claimed in claim 1 wherein said computer database model of said facility is a three-dimensional model.

5. A system for creating a computer database model for recorded network data throughput properties within a facility, comprising:
    a mobile client computer for roving within a facility;
    a server computer, positioned in said facility, for hosting said mobile client computer;
    means for recording data throughput properties between said mobile client computer and said server computer or other mobile client computer at a plurality of locations within said facility;
    means for representing said facility in a database model;
    means for embedding said recorded data throughput properties at each of said plurality of locations within said database model of said facility; and
    means for displaying said database model of said facility overlayed with said embedded data throughput properties.

6. A system for creating a computer database model for recorded network data throughput properties within a facility as claimed in claim 5, wherein said recorded data throughput properties include recording data throughput as a function of time and location within said facility.

7. A system for creating a computer database model for recorded network data throughput properties within a facility as claimed in claim 5, wherein said facility is a single multi-level building.

8. A system for creating a computer database model for recorded network data throughput properties within a facility as claimed in claim 5, wherein said facility is a plurality of multi-level buildings.

9. A system for creating a computer database model for recorded network data throughput properties within a facility as claimed in claim 5, wherein said system includes a means for automatically periodically determining a location of said mobile client computer within said facility.

10. A system for creating a computer database model for recorded network data throughput properties within a facility as claimed in claim 5, wherein said database model of said facility is a three-dimensional model.

11. A system for creating a computer database model for recorded network data throughput properties within a facility as claimed in claim 5, wherein said server computer is mobile within said facility.

12. A system for creating a computer database model for recorded network data throughput properties within a facility as claimed in claim 5, wherein said data throughput properties include data throughput rate, frame errors, packet retries, network data throughput, and network delay due to a fixed non-wireless portion of a network.

\* \* \* \* \*